June 29, 1954 R. J. CONDON Re. 23,844

LIQUID LEVEL INDICATING APPARATUS

Original Filed Oct. 28, 1950

INVENTOR.
RAYMOND J. CONDON
BY
George H. Fisher
ATTORNEY.

Reissued June 29, 1954 Re. 23,844

UNITED STATES PATENT OFFICE 23,844

LIQUID LEVEL INDICATING APPARATUS

Raymond J. Condon, Dayton, Ohio, assignor to Minneapolis-Honeywell Regulator Company, Minneapolis, Minn., a corporation of Delaware Original No. 2,648,982, dated August 18, 1953, Serial No. 192,679, October 28, 1950. Application for reissue September 2, 1953, Serial No. 378,187

10 Claims. (Cl. 73—304)

Matter enclosed in heavy brackets [ ] appears in the original patent but forms no part of this reissue specification; matter printed in italics indicates the additions made by reissue.

This invention is primarily concerned with tank units of the capacitive type for measuring the amount of fuel in fuel tanks for aircraft and particularly with tank units for accurately measuring the amount of fuel in non-uniform tanks. It is therefore an object of the present invention to provide a tank unit which accurately measures the fuel in non-uniform fuel tanks which vary in cross-sectional area at different levels of the tanks.

A further object of the invention is to provide a tank unit capable of being easily adapted to different shapes of fuel tanks to accurately measure the fuel therein.

Another object of the invention is to provide a capacitive type of tank unit in which one of the electrodes is specially "tailored" to vary the capacitance in accordance with the shape of the tank.

Another object of the invention is to provide a capacitive type of tank unit in which one of the electrodes is a longitudinally coiled wire or strip with the pitch between the turns being varied to vary the capacitance in accordance with the shape of the tank.

The illustrative embodiment of the invention comprises a capacitive tank unit in which the inner electrode is a conductive wire wound about an insulative core with the spacing between the turns being determined by the horizontal cross-sectional area of the tank at various levels in order that the capacitance of the tank unit changes linearly with change in the amount of fuel in the tank.

Because the capacitance of the tank unit varies linearly with change in the amount of fuel in the tank the indicator which indicates the quantity of fuel in the tank may be calibrated linearly over the dial and need not be specially calibrated for the particular shape of the tank.

Also, because the capacitance of the tank unit varies linearly with change in the amount of fuel in the tank a signal which varies linearly with the quantity of fuel can always be obtained from the bridge circuit into which the tank unit is connected. Because linear signals can be obtained it is possible to add a number of signals from different tank units together to obtain a signal indicative of the total quantity of fuel in a number of tanks.

Figure 1:
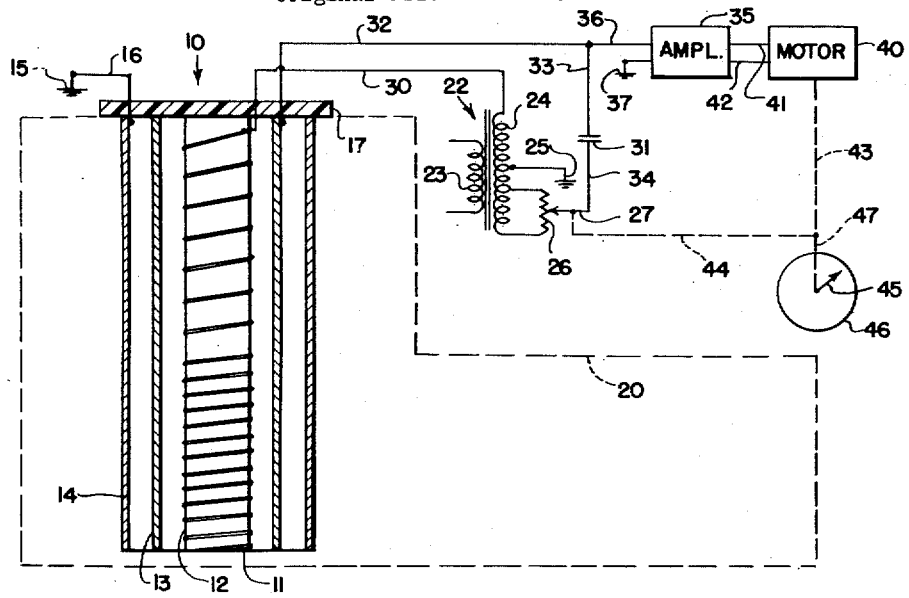
Figure 2:
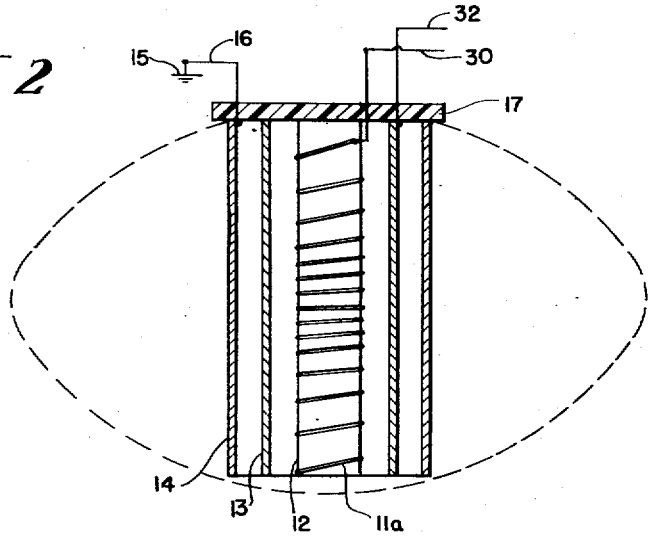

For a better understanding of the invention reference is had to the following detailed description in conjunction with the accompanying drawings, in which:

Figure 1 is a view, partially in section, of the tank unit in an L-shaped tank, with the tank unit connected into a circuit utilizing the signal from the tank unit; and Figure 2 is a view, partially in section, of the tank unit in an elliptical tank.

In Figure 1 a tank unit 10 is shown to have a conductive wire 11 wound about an insulative core 12. This conductive wire acts as one electrode of the tank unit. A conductive cylinder 13 coaxially mounted with respect to the core 12 and of somewhat greater diameter is the second electrode of the tank unit. A second conductive cylinder 14, positioned about cylinder 13, acts as a shield and is shown to be connected to a ground terminal 15 through conductor 16. The core 12 is cylindrical and the two cylinders, 13 and 14, are positioned symmetrically about the core. Thus, the distance between the two electrodes, 11 and 13, is the same throughout the length of the tank unit.

An insulative plate 17 forms the top of the tank unit and holds the various electrodes in place with respect to each other. As the invention lies primarily in the use of the wound wire as the inner electrode of the capacitor the mounting of the electrodes and shield with respect to each other and with respect to the tank is shown only schematically and not as it would necessarily appear in an actual unit.

The tank unit 10 is positioned in a tank, such as one having a shape of the tank 20, shown only schematically. Obviously, the comparative sizes of the tank 20 and tank unit 10 would not be that as shown in the drawing, but rather the tank unit would fill a much smaller portion of the tank. The unit is shown out of proportion in the drawing merely to more clearly show the inventive details of the unit. Also, it is desirable to position the tank unit along the the overall center of gravity line if that is possible.

It is well known that the capacitance of a tank unit varies with rise and fall of the fuel in the tank. This is because of the change in the dielectric constant of the fluid between the electrodes. The dielectric constant of air is 1.0 while that of a representative fuel would be 2.0. Thus, with the tank full of fuel the capacitance of the tank unit would be twice the capacitance of the tank unit when the tank is empty. If the cross-sectional area of the tank changes it is desirable to have the capacitance per unit length change also in order that the capacitance of the tank unit changes linearly with change of fuel as it rises and falls in the tank. If the tank is irregular in shape the level of the fuel as it is being used falls a greater distance for a given quantity of fuel used, if the tank has a comparatively narrow cross-sectional area than if it has a large cross-sectional area. It is desirable then for the capacitance of the tank unit to vary less per unit length for the comparatively narrow portions of the tank than it does for the wider portions of the tank.

In the tank shown in Figure 1 the upper half of the tank has only half the cross-sectional area of the lower half of the tank. Accordingly, it is desirable that the upper half of the tank unit positioned in the tank have only half the capacitance change per unit length of the lower half of the tank unit. Thus, the wire 11 on the core 12 has approximately twice as many turns per unit length on the lower portion of the tank unit as it does on the upper portion. Because of fringe effects the spacing between the wires on the upper portion of the core would not be exactly twice as great as the spacing between the turns on the lower portion. The amount of spacing between the turns can be determined experimentally in order that the change in capacity be exactly that desired. In actual practice the turns of wire would be spaced much closer together in order to increase the total capacitance per unit length of the tank unit. For ease in observation, however, they have been shown spaced comparatively far apart.

The purpose of the shield 14 is to prevent any stray effects, such as radio frequency waves, from affecting the potential of the outer electrode 13 and thus affecting the signal output from the tank unit.

As shown in the drawing, the fuel may enter the tank unit between the various cylinders at the bottom of the tank unit. Holes are provided in the top of the tank unit to permit the air to enter and escape with rise and fall of the fuel.

The tank unit 10 is connected to a bridge circuit energized from a transformer 22 having a primary 23 connected to any convenient source of power, not shown. The transformer 22 further has a secondary 24 which is center tapped to a ground terminal 25. A potentiometer comprising a resistor 26 and a wiper arm 27 is shown to be connected across the lower portion of transformer secondary 24. This is for rebalancing purposes as will be described later.

The inner electrode wire 11 is connected to the upper terminal of transformer secondary 24 through conductor 30. The outer electrode 13 of the tank unit 10 is connected to a capacitor 31 through conductors 32 and 33. The other plate of capacitor 31 is connected to wiper arm 27 through conductor 34. It is thus seen that the two capacitors are energized by voltage from the transformer 22.

One of the output terminals of the bridge is from the junction between the outer electrode 13 of the tank unit 10 and capacitor 31. The other output terminal is the ground terminal 25. The connection between the tank unit 10 and capacitor 31 is connected to amplifier 35 through conductor 36. The other input terminal of the amplifier is connected to a ground terminal 37. The amplifier 35 is connected for energization to any suitable source of power, not shown.

When there is a potential difference between the connection between the tank unit and capacitor 31 and ground there is a voltage output from the bridge to amplifier 35 which amplifies the signal and produces an output voltage.

The amplifier 35 is connected to a motor 40 through conductors 41 and 42. The motor may be powered by any convenient source of power, not shown. When the amplifier has a voltage output the motor is energized and operates through mechanical connections 43 and 44 to move the wiper arm 27 along resistor 26 to vary the voltage across capacitor 31 until the voltage output from the bridge circuit is reduced to zero.

The motor 40 is also connected to a pointer 45 on an indicator dial 46 by means of mechanical connections 43 and 47.

The amplifier and motor circuit may be that shown in Upton Patent 2,423,534, assigned to the same assignee as the present invention.

Figure 2 shows the use of the tank unit in an elliptical tank such as those used as bomb bay tanks. In this tank unit the core 12, outer electrode 13 and shield cylinder 14, as well as the insulator cover 17 are all identical with those shown in tank unit 10 of Figure 1. The only difference between the tank units of the two figures is in the spacing of the turns of wire on the core 12. Because the tank shown in Figure 2 has its greatest cross-sectional area at the center of the tank it is necessary that the turns of the wire 11a be closer together at the center with the spacing between the turns gradually increasing along the core toward the top and the bottom of the tank. In operation the use of this tank unit is no different from that shown in Figure 1. It may be connected into the same type of circuit as is shown in Figure 1.

Obviously, a conductive strip of material may be used in place of the wire wound about the core with the spacing between the turns of the strip being determined by the cross-sectional area of the tank.

It is seen that a tank unit has been designed which is very flexible in that it may be easily constructed to give linear indications of capacitance change with fuel quantity change for any shape of fuel tank. This type of tank unit also permits the use of a uniform dial which may be uniformly calibrated across its face. In addition, because the signal voltage change is linear with fuel quantity change the signal voltages from a number of such units may be added together to obtain a total fuel quantity signal.

Various modifications of the tank unit shown may be made by those skilled in the art while yet remaining within the spirit of the invention and it is therefore intended that the scope of the invention be limited only to the extent of the appended claims.

I claim as my invention:

1. A capacitor for measuring the quantity of a substance in a non-uniform container, comprising: a first longitudinal conductive member adapted to be positioned vertically in the container, said member comprising one plate of the capacitor; and a coiled conductive member positioned along the length of said first member and parallel thereto, said coiled member comprising the second plate of the capacitor, the spacing between the turns of the coil being determined by the horizontal cross-sectional area of the container such that the capacitance of the capacitor varies uniformly with change in volume of the substance.

2. A capacitor for measuring the quantity of a substance in a non-uniform container, comprising: a conductive cylinder positioned vertically in the container, said cylinder comprising one plate of the capacitor; and a coiled conductive member positioned symmetrically within said cylinder, said member comprising the second plate of the capacitor, the spacing between the turns of the member being determined by the horizontal cross-sectional area of the container such that the capacitance of the capacitor varies uniformly with change in volume of the substance.

3. A capacitor for measuring the quantity of a substance in a non-uniform container, comprising: a conductive cylinder positioned vertically in the container, said cylinder comprising one plate of the capacitor; a cylindrical insulative member positioned symmetrically within said cylinder; and a conductive wire wound about said member, the wire comprising the second plate of the capacitor, the spacing between the turns of the wire being determined by the horizontal cross-sectional area of the container such that the capacitance of the capacitor varies uniformly with change in volume of the substance.

4. Apparatus for measuring the quantity of liquid in a non-uniform container, comprising: a capacitor positioned vertically in a container containing a liquid, said capacitor having a pair of electrodes, one of said electrodes comprising a conductive cylinder, the other of said electrodes comprising a coiled conductive member positioned symmetrically within said cylinder, the spacing between the turns of the member being determined by the horizontal cross-sectional area of the container such that the capacitance of the capacitor varies uniformly with change in volume of the liquid; and means connected to said capacitor to receive a signal therefrom and indicate the amount of the liquid in the container.

5. Apparatus for measuring the quantity of liquid in a non-uniform container, comprising: a capacitor positioned vertically in a container containing a liquid, said capacitor having a pair of electrodes, one of said electrodes comprising a conductive cylinder, the capacitor further comprising an insulative cylindrical member positioned symmetrically within said cylinder, the other electrode comprising a conductive wire wound about said member, the spacing between the turns of the wire being determined by the horizontal cross-sectional area of the container such that the capacitance of the capacitor varies uniformly with change in volume of the liquid; and means connected to said capacitor to receive a signal therefrom and indicate the amount of liquid in the container.

6. A capacitor for measuring the quantity of a substance in a non-uniform container, comprising: a conductive cylinder designed to be positioned in the container such that the cylinder extends from the top to the bottom of the container, said cylinder comprising one plate of the capacitor; and a coiled conductive member positioned symmetrically within said cylinder, said member comprising the second plate of the capacitor, the spacing between the turns of the member being determined by the horizontal cross-sectional area of the container such that the capacitance of the capacitor varies uniformly with change in volume of the substance.

7. A capacitor for measuring the quantity of a substance in a non-uniform portion of a container, comprising: a conductive cylinder designed to be positioned in the container such that the cylinder extends from the top to the bottom of the portion of the container containing the substance to be measured by the capacitor, said cylinder comprising one plate of the capacitor; and a coiled conductive member positioned symmetrically within said cylinder, said member comprising the second plate of the capacitor, the spacing between the turns of the member being determined by the horizontal cross-sectional area of said portion of the container such that the capacitance of the capacitor varies uniformly with change in volume of the substance to be measured.

*8. A capacitor for measuring the quantity of a substance in a portion of a container, which portion may be non-uniform in cross-sectional area, comprising: a first conductive member adapted to be positioned in the container and having a length sufficient to extend from the top to the bottom of the portion of the container containing the substance to be measured by the capacitor, said member comprising one plate of the capacitor; and a coiled conductive member substantially coextensive with said first member and spaced from said first member, said coiled member comprising the second plate of the capacitor, the spacings between the turns of the coiled member being such that the capacitance of said capacitor varies along the length of the capacitor in a manner proportional to the variations in cross-sectional area of the portion of the container into which said capacitor is adapted to be positioned.*

*9. A capacitor for measuring the quantity of a substance in a portion of a container which portion may be non-uniform in cross-sectional area, comprising: a pair of spaced electrodes adapted to be positioned in the container and having a length sufficient to extend from the top to the bottom of the portion of the container containing the substance to be measured by the capacitor, one of said electrodes comprising a coiled conductive member, the spacings between the turns of said coiled member being such that the capacitance of the capacitor varies along the length of the capacitor in a manner proportional to the variation in cross-sectional area of the portion of the container into which said capacitor is adapted to be positioned.*

*10. A capacitor for measuring the quantity of a substance in a portion of a container which portion may be non-uniform in cross-sectional area, comprising: insulative support means and a pair of spaced electrodes adapted to be positioned in the container such that the support means and electrodes have a length sufficient to extend from the top to the bottom of the portion of the container containing the substance to be measured by the capacitor, one of said electrodes comprising a coiled conductive member supported by said support means, the spacings between the turns of said coiled member being such that the capacitance of said capacitor varies along the length of the capacitor in a manner proportional to the variations in cross-sectional area of the portion of the container into which said capacitor is adapted to be positioned.*

References Cited in the file of this patent or the original patent

UNITED STATES PATENTS

| Number | Name | Date |
|---|---|---|
| 2,544,012 | Edelman | Mar, 6, 1951 |
| 2,582,400 | Smith | Jan. 15, 1952 |

FOREIGN PATENTS

| Number | Country | Date |
|---|---|---|
| 207,649 | Great Britain | Dec. 6, 1923 |

OTHER REFERENCES

R. C. A. Receiving Tube Manual, copyright 1940.